(12) United States Patent
Savage et al.

(10) Patent No.: US 9,132,974 B2
(45) Date of Patent: Sep. 15, 2015

(54) CASK

(75) Inventors: Nick Savage, Menstrie (GB); Abdy Kermani, Edinburgh (GB); Jim Beveridge, Alexandria (GB)

(73) Assignee: Diageo Great Britain Ltd., London (GB)

( * ) Notice: Subject to any disclaimer, the term of this patent is extended or adjusted under 35 U.S.C. 154(b) by 34 days.

(21) Appl. No.: 13/641,262

(22) PCT Filed: Apr. 11, 2011

(86) PCT No.: PCT/GB2011/050707
§ 371 (c)(1),
(2), (4) Date: Nov. 28, 2012

(87) PCT Pub. No.: WO2011/128670
PCT Pub. Date: Oct. 20, 2011

(65) Prior Publication Data
US 2013/0094934 A1    Apr. 18, 2013

(30) Foreign Application Priority Data

Apr. 15, 2010 (GB) .................................. 1006278.4
Aug. 11, 2010 (GB) .................................. 1013486.4

(51) Int. Cl.
*B65G 57/00* (2006.01)
*B65D 6/02* (2006.01)

(52) U.S. Cl.
CPC . *B65G 57/00* (2013.01); *B65D 9/06* (2013.01)

(58) Field of Classification Search
CPC ............. B65D 21/0235; B65D 21/048; B65D 21/046; B65D 21/045; B65D 21/043; B65D 21/04; B65D 21/041; B65D 21/02; B65D 21/0201; B65D 9/04; B65D 9/06
USPC ........ 414/788, 801, 802, 788.2, 788.9, 789.8, 414/790.4, 791.6, 792.7, 795.6, 796.5, 414/798.4; 220/4.26, 4.27, 23.83, 23.86; 206/507, 505, 504, 503
See application file for complete search history.

(56) References Cited

U.S. PATENT DOCUMENTS 2,111,884 A * 3/1938 Cahaney ....................... 220/804
3,220,583 A * 11/1965 Robertson ..................... 414/802
3,292,779 A * 12/1966 Colella ............................ 206/82

(Continued)

FOREIGN PATENT DOCUMENTS

CN    201183620    1/2009
CN    201261566    6/2009

(Continued)

OTHER PUBLICATIONS

International Search Report for PCT/GB2011/050707.

*Primary Examiner* — Saul Rodriguez
*Assistant Examiner* — Lynn Schwenning
(74) *Attorney, Agent, or Firm* — Scherrer Patent & Trademark Law, P.C.; Stephen T. Scherrer; Monique A. Morneault

(57) ABSTRACT

A cask for whisky (10), e.g. in a hexagonal or triangular prism shape for ease of stackability. The cask is comprised of a number of staves (11), bound together to form the prism shape. Accordingly, stacking multiple casks naturally compresses the staves together and reduces spirit loss through the side wall of a cask. A method for stacking casks is also described, wherein the cask may be hexagonal, triangular or square ended.

5 Claims, 3 Drawing Sheets

(56) References Cited

U.S. PATENT DOCUMENTS

| | | | |
|---|---|---|---|
| 3,425,586 A * | 2/1969 | Petters et al. | 220/23.4 |
| 3,456,827 A * | 7/1969 | Wakeem | 217/72 |
| 3,462,038 A | 8/1969 | Morris | |
| 3,563,408 A * | 2/1971 | Bijvoet | 220/671 |
| 3,583,590 A * | 6/1971 | Ferraro | 215/10 |
| 3,765,574 A * | 10/1973 | Urquiza | 222/183 |
| 4,093,099 A * | 6/1978 | Spooner | 217/72 |
| 4,484,688 A | 11/1984 | Smith | |
| 4,506,796 A | 3/1985 | Thompson | |
| 4,703,866 A | 11/1987 | Scott | |
| 6,325,212 B2 * | 12/2001 | Przytulla et al. | 206/509 |
| 7,240,609 B2 * | 7/2007 | Berecz | 99/277.1 |
| 2005/0172817 A1 | 8/2005 | Berecz | |
| 2006/0175333 A1 * | 8/2006 | Johanson et al. | 220/270 |
| 2006/0261060 A1 * | 11/2006 | Baez | 220/4.21 |
| 2007/0000929 A1 * | 1/2007 | Fernandez | 220/565 |

FOREIGN PATENT DOCUMENTS

| | | | |
|---|---|---|---|
| EP | 0007145 | | 1/1980 |
| EP | 0953305 | | 11/1999 |
| EP | 2186738 | | 5/2010 |
| GB | 24237 | * | 10/1915 |
| GB | 890926 | * | 2/1962 |

* cited by examiner

Fig. 0001
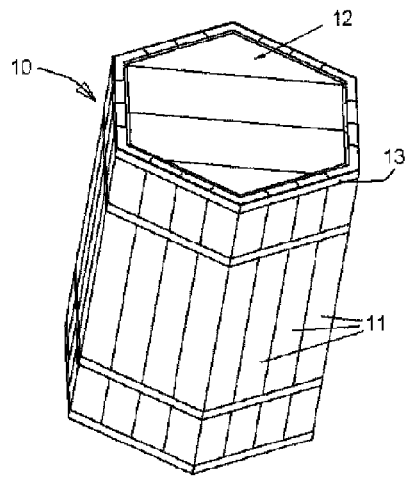
Fig. 0002
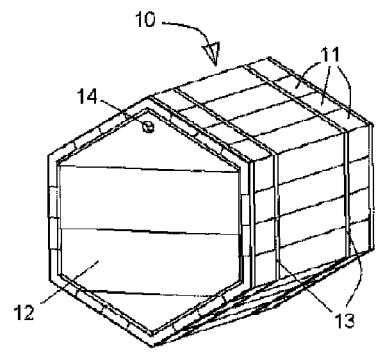
Fig. 0003
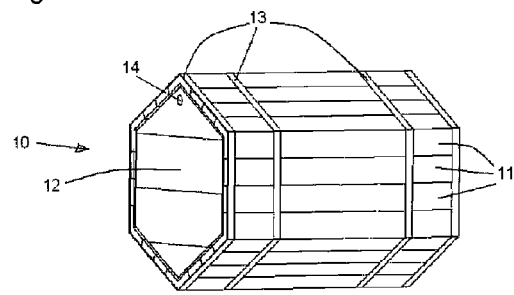
Fig. 0004
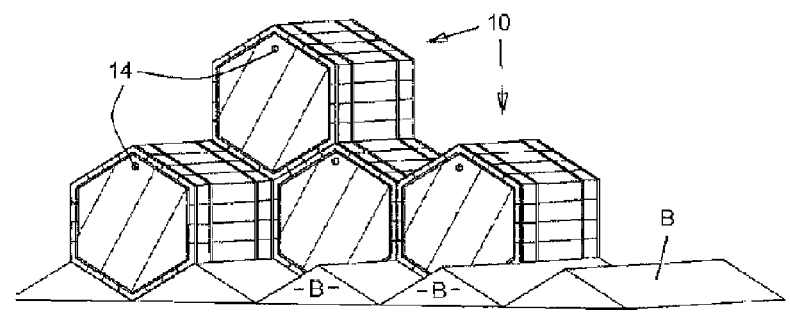

Fig. 0005
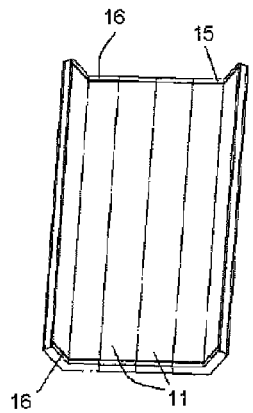
Fig. 0006
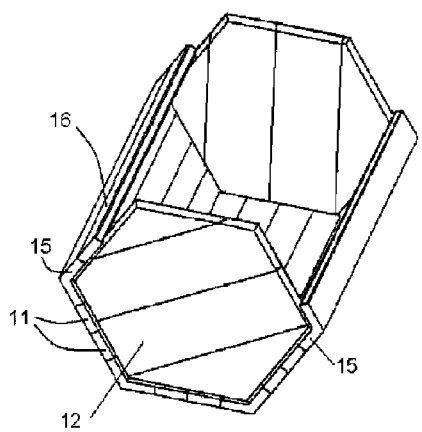
Fig. 0007
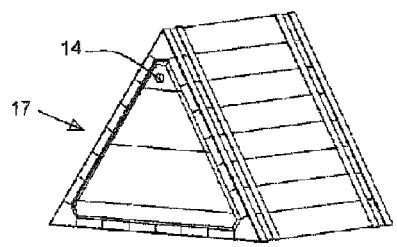
Fig. 0008
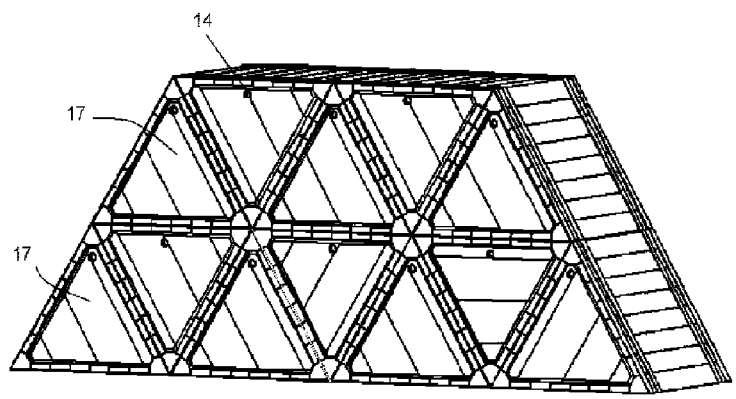

Fig. 0009
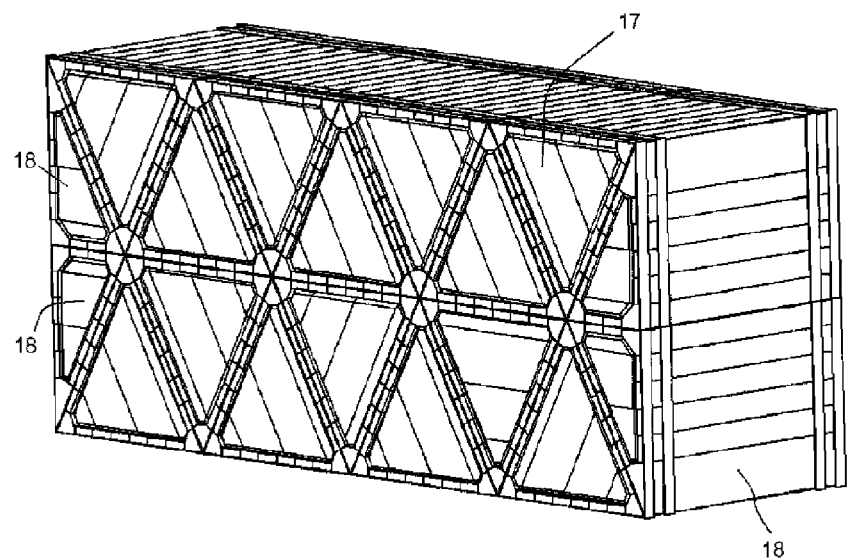
Fig. 0010
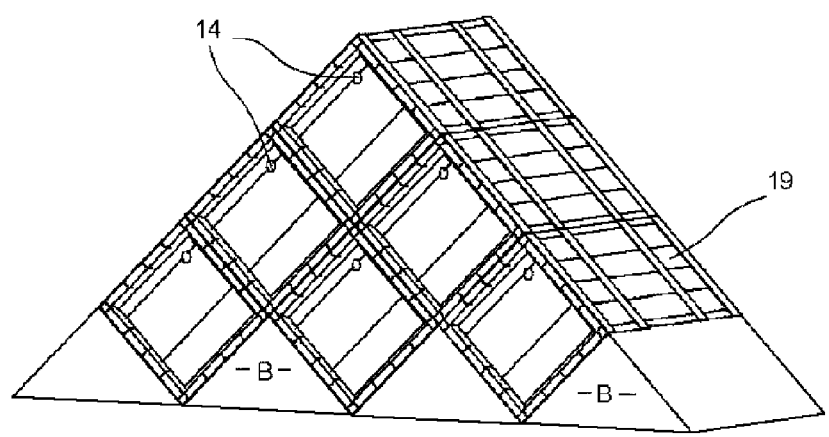

CASK

The present disclosure claims priority to PCT Patent Application No. PCT/GB2011/050707, filed Apr. 11, 2011, and GB Patent Application Nos. 1006278.4, filed Apr. 15, 2010, and 1013486.4, filed Aug. 11, 2010, each of which is incorporated herein by reference in its entirety.

TECHNICAL FIELD

The present invention relates to a cask for storing and "maturing" distilled spirits, particularly whisky (alt. whiskey).

BACKGROUND ART

A traditional whisky cask is a bilge-barrel shape, formed by a plurality of curved staves that result in an overall bulge when it is assembled and bound together. Such a bulge (bilge) is useful for manually rolling and controlling the direction of the cask, which may weigh 500 kg or more, on its side.

Casks for spirits can be made of any suitable material; however, whisky casks are required to be made from oak which is important for the maturation process. It is typically found that after several uses (e.g. at intervals of ten years when a new batch of spirit is introduced to the cask for maturation) the interior wood of the cask must be "rejuvenated" by flailing the surface (e.g. by wire brush) in contact with the spirit. As such an average barrel normally has a lifespan of 50 years.

The general design of whisky casks in common use, made from oak, has not changed significantly in many hundreds of years, although some attempt has been made to introduce new designs over the years. For example,
Patent Citation 0001: GB 1136469 A (GEORGE RICHARD MORRIS; ALVA DONALD MESSENHEIMER). Dec. 11, 1968.
describes a square ended barrel with the intent to save space in a warehouse; since square shapes can pack together more efficiently than a circular/cylindrical shape that must necessarily have empty gaps therebetween.

However, GB1136469 in fact describes a "cabinet" construction and not a cask in the traditional sense. The staves of the cabinet must have a jointing mechanism and rely on an elastomeric bonding agent for sealing and cohesion.

A particular problem experienced with traditional cask designs, i.e. casks that do not utilise bonding and/or sealing agents, is that when warehoused (e.g. palletised upright or high racked on their bilge; in both cases up to six levels high) the staves can be forced apart by sheer weight, causing slow loss of spirit. Loss is also observed at the area of the bung where whisky is introduced/removed from the barrel.

DISCLOSURE OF INVENTION

The present invention therefore seeks to address problems observed with traditional whisky casks and provide an alternative.

In one broad aspect there is provided a method of warehousing casks for whisky, utilising a plurality of straight walled casks and stacking same such that the walls are compressible by the weight of an adjacent cask. Preferably, the casks are oriented on their sides and with a corner edge of the cask in a 12 o'clock and/or 6 o'clock position to obtain the optimum weight distribution possible for acting on all sides of the cask.

The casks are preferably comprised of a plurality of staves bound together to form hexagonal, triangular or square/diamond prism shapes. Preferably the ends/sides are of equal length (i.e. regular hexagon, equilateral triangle, square not rectangle etc).

The method may require use of a base with a support surface to fill the gaps of the lowermost row of casks.

The advantage of these shapes is that downward force applied by the weight of stacked casks creates a compressed wall structure that will reduce spirit loss between the staves that comprise the cask walls.

Furthermore, the use of a straight stave length makes the cask easier to construct and simplifies the rejuvenation process where it is intended to remove timber that has been in contact with spirit stored in the cask.

An associated advantage found in the present invention is the space economy of stacking compared to a traditional barrel. It will be appreciated that bilge-barrel shapes, even when tightly packed and stacked together, result in significant empty and un-fillable space in a warehouse. In the present invention, multiple casks can be stacked or nestle to form a bank of like shaped casks with no gaps therebetween.

As described above, to obtain optimum compression laterally between the staves in contact with each other the casks are oriented on their sides with a corner edge of the cask wall in a downward (and/or opposing upward, 6 and/or 12 o'clock) position. For example, in the case of hexagonal casks, this results in a honeycomb end appearance when stacked, requiring a base with a support surface of a jagged shape to fill the gaps between the lowermost row of casks and the floor. In the case of a square-ended cask, stacking is performed such that there is a diamond appearance. Likewise, preferably a jagged (triangular support surface) base is provided that supports the lowermost row of casks.

In a second broad aspect there is provided a cask for whisky constructed from a plurality of straight staves bound together to form a prism-shape such that, when stacked with other like casks, it is able to result in a self compressing wall structure.

The term "bound" implies use of a high-tension strap or equivalent and, specifically, the absence of bonding or sealing agents between the staves. The avoidance of chemical agents ensures that no adverse taste can be imparted to the spirit housed by the cask during the maturation process.

Preferably the prism-shape is a hexagonal prism. The shape may also be triangular. In another form the shape may be square/diamond ended. These most preferable shapes are such that no gaps form between adjacent casks when stacked in a warehouse.

It will be apparent that a plurality of casks according to the second aspect of the invention can be utilised in a warehousing system that follows the method of the first aspect of the invention. Specifically, according to a third aspect there is provided a system of warehousing casks for whisky, utilising a plurality of casks constructed from a plurality of straight staves bound together to form a prism-shape wherein the casks are oriented on their sides and with a corner edge of the cask in a 12 o'clock and/or 6 o'clock position.

Preferably the system includes a support surface with ridges upon which a lowermost row of casks is in contact.

BRIEF DESCRIPTION OF DRAWINGS

FIG. 1 illustrates an underneath view of a cask according to a first embodiment,
FIG. 2 illustrates a frontal isometric view,
FIG. 3 illustrates a side view, FIG. 4 illustrates a view of a plurality of casks according to the first embodiment of the invention stacked for storage, FIG. 5 shows a side wall for a cask of the invention, FIG. 6 shows a partially assembled cask according to the invention;

FIG. 7 shows a frontal view of a cask according to a second embodiment of the invention, FIG. 8 shows a view of a plurality of stacked casks according to the second embodiment, FIG. 9 shows a second view of a plurality of stacked casks according to the second embodiment, and FIG. 10 shows a plurality of stacked casks according to a third embodiment of the invention.

MODE(S) FOR CARRYING OUT THE INVENTION

FIGS. 1 to 3 show general views of a whisky cask according to a first embodiment of the invention. A cask 10 is assembled from a plurality of staves 11 arranged around a hexagonal end 12 which itself is formed from several lengths of oak. The staves are bound together by several straps 13 that are tensioned and joined in a conventional manner. Ideally a strap 13 is placed at each end of the cask to compress the staves against the hexagonal ends 12 such that they are sealed therewith.

Stave edges may be constructed with tongue-in-groove joints to assist assembly. This is distinguished from other construction methods that require adhesives or other mechanical fasteners (e.g. bolts or screws) that may affect the taste of the stored spirit. An alternative to a tongue-in-groove joint is a convex radius mating with a matching concave radius, however, any suitable joining method could be employed.

FIGS. 2 and 3 each show an access/bung hole 14 located at a corner of the hexagonal cask shape. It is intended that, when stacked, the hole will always be in the uppermost corner (12 o'clock position) to minimise leaking. Preferably, spirit is filled to just below the level of the hole which, it will be appreciated, results in less volume wastage than a conventional cask that has a round end and bulged shape, i.e. because in such a conventional cask there will be a greater empty volume above the fill line in a cask that is otherwise the same capacity as the cask of the invention.

When first filled the casks can be in a horizontal (FIG. 2) or vertical orientation. They are then moved (e.g. by forklift or other mechanised means) into a stacked position which may also be a vertical configuration, but preferably according to the method of the invention, horizontal (i.e. hexagonal ends 12 showing) as illustrated by FIG. 4.

In the configuration illustrated by FIG. 4 casks 10 are stacked on a base B providing a series of shallow triangular supporting surfaces that fill the gap that would otherwise form between the lowermost point of the hexagon (the 6 o'clock position) and the floor. The support surface could be cast in concrete or be of frame construction.

The stack may take an overall "honeycomb" formation having one fewer cask on each successive level. In the illustrated example, there is provision to support four casks 10 on the base B, followed by three on a second level, then two, then one (although it will be noted not all ten casks in the proposed stack are illustrated).

Alternatively, a pair of side brackets could be formed on a warehouse wall or support structure to receive and stabilise a block of stacked casks 10 to maximise storage efficiency in a warehouse in the vertical direction. Referring to FIG. 4, base B supports four casks 10. On top of these could stack five further casks, followed by a third row of four casks, then alternating between four and five casks per level up to any practical height. Stacking in this manner most completely takes advantage of the "self-compressing" nature of the casks according to the invention.

It is envisaged that, once stacked, the casks may not be moved again until rejuvenation is required. Liquid can be introduced/removed from the casks via bung hole 14 in situ with the use of a tanker. Furthermore, casks can be stacked in rows, back-to-back (or, more correctly, base-to-base) with an aisle wide enough to allow access to each bung 14, e.g. by a cherry-picker.

The geometry of a system of hexagonal prisms allows a uniform distribution of forces and utilises the weight of the full casks to compress the stave joints and improve sealing. Furthermore, particularly for a cask located centrally in a back-to-back stacked cluster, the only exposed surface is one hexagonal end, minimising air flow around the cask as a whole which is associated with spirit loss.

FIGS. 5 and 6 illustrate one form of construction for a hexagonal cask according to the invention where corner pieces 15 provide the internal angle (120°) for the hexagonal configuration while staves 11 make up side walls. It will be appreciated that different volumes of cask can be constructed merely by varying the number of staves per side. No additional tooling is required (because corners 15 are the same) except a new hexagonal end 12 (smaller or larger area) must be supplied.

As discussed, rejuvenation is a relatively simple (but time consuming) process where casks are dismantled, inspected and reconditioned for further use. It will be appreciated that a straight stave 17 can be flailed more easily than the curved stave of a conventional cask. Flailing normally removes wood from the substantive length, but leaves the joint channel 16 where end 12 is located. Likewise, end 12 can be flailed over its substantive surface, but not in the area where it forms a seal with the staves. Alternatively, it can simply be reversed, i.e. the once outer end surface of the cask can be turned inward when the cask is reassembled so that "fresh" wood is in contact with the maturing spirit.

FIGS. 7 and 8 illustrate a second embodiment that is analogous to the cask of FIGS. 1 to 6. In this embodiment the cask 17 has a triangular prism configuration such that it can be stacked, once again, to provide a distribution of forces that tightly packs the units together thereby minimising spirit loss. The cask 17 also has a bung 14 located at an uppermost portion (top corner or 12 o'clock position) where it can result in even less empty space in the cask than a hexagonal configuration, if filled to below the hole.

FIG. 8 shows that the generally equilateral triangle ended casks fit together in an alternating flat and upturned position to form a stack. In this case the bungs 14 should be formed at two different positions, i.e. at a corner and top edge, depending on what orientation the cask takes. Such holes can be drilled after stacking prior to filling.

As in the case of stacking hexagonal casks, the triangular shape will naturally lead to a pyramid type construction (i.e. a first layer of n casks, second layer of n−1, third of n−2 etc) if left to be self supporting. It will be appreciated that a side supporting bracket, including surfaces to engage with the exposed sidewalls of the stack can be provided to enable more space efficient packing in a vertical direction.

It should be noted that equilateral triangle-faced casks could be stacked with a flat side in a vertical orientation (with use of suitable support brackets etc at the side/base of the stack) such that bung holes 14 can all be located at an uppermost corner and, therefore, a single form of cask can be used.

FIG. 9 illustrates an example where all available space is utilised by employing an equilateral triangle cask 17 as described, complemented by a smaller right-angle triangle cask 18 at the ends of each row.

It will be appreciated that other triangle variations are possible, particularly isosceles configurations, however, an equilateral triangle has a more efficient material-to-volume ratio.

It will be clear from the foregoing that the invention is embodied by a method of stacking straight-walled casks, to utilise the natural compression between units that will minimise spirit loss when packed in a warehouse for an extended time period. In this regard, a third embodiment, illustrated by FIG. 10, utilises a square-ended cask 19 that is stacked to result in a diamond nestled configuration, taking advantage of similarly natural compression of the staves in the cask as other embodiments.

Square/diamond-ended casks as stacked according to the method of the invention, require a base B comparable to FIG. 4, which will support the downwardly pointed (6 o'clock) corner of the cask 19. It is also possible, as with hexagonal and triangular configurations, to use a side supporting structure to enable more space efficient stacking in a vertical direction, rather than the self supporting n–1 successive row configuration as shown in FIG. 10.

Square/diamond casks 19 can each have a bung hole 14 in the uppermost corner (12 o'clock) when stacked as illustrated, providing similar benefits for filling as described in connection with the previous embodiments.

INDUSTRIAL APPLICABILITY

In general it is intended that all embodiments are able to be manufactured from available techniques and materials (i.e. oak).

The invention has the combined advantages of providing improvements to minimise loss of spirit, increase warehouse economy and improve the ease/efficiency of rejuvenation compared to more traditional barrel designs.

The invention claimed is:

1. A method of warehousing casks for whiskey comprising the steps of:
    providing a plurality of casks, each cask consisting essentially of of a plurality of straight staves with mating edges arranged around two ends, wherein each of the casks are bound to compress the staves against the ends and each other to form a hexagonal, triangular or square/diamond prism shape that has at least three flat sides;
    orienting said casks such that the straight staves extend longitudinally and with a corner edge of the prism shape in a 12 o'clock and/or 6 o'clock position; and
    stacking the casks with one another such that at least one flat side of at least one cask is compressed from the weight of an upper cask, thereby further compressing the longitudinally extending staves at the mating edges.

2. The method of warehousing casks according to claim 1 wherein there is an aperture at the 12 o'clock corner or uppermost position on a cask end.

3. The method of warehousing casks according to claim 2 wherein the casks are stacked empty and then the aperture is formed such that liquid can be introduced.

4. The method of warehousing casks according to claim 1 wherein a lowermost row of casks is located on a base with a support surface provided to stabilize the casks.

5. The method of warehousing casks according to claim 4 wherein the support surface is triangular in appearance to contact flat walls of the casks and maintain them at an angular orientation.

* * * * *